Dec. 23, 1958     J. A. DICKIE     2,865,173
FLUID-OPERATED VIBRATION TEST EXCITER AND
METHOD OF OPERATING SAME

Filed Sept. 2, 1955     2 Sheets—Sheet 1

Inventor
John A. Dickie
By his attorneys

Howson and Howson

Inventor
John A. Dickie
By his attorneys
Howson and Howson

United States Patent Office 2,865,173
Patented Dec. 23, 1958

2,865,173

FLUID-OPERATED VIBRATION TEST EXCITER AND METHOD OF OPERATING SAME

John A. Dickie, Hamden, Conn., assignor, by mesne assignments, to Textron Inc., a corporation of Rhode Island Application September 2, 1955, Serial No. 532,307

13 Claims. (Cl. 60—52)

This invention relates to fluid-operated vibration test exciters and methods of operating same, and more particularly to means which enable the system to be operated over a range of conditions which are uniformly varied in one characteristic while the other characteristics are held uniform. It is the object of the present invention to provide automatic cycling of the frequency of a hydraulic reciprocatory vibration test exciter system while maintaining constant one of the parameters of displacement, velocity or acceleration of the exciter.

Testing of mechanical and electrical structures to check their dynamic behavior and their resistance to fatigue is now an accepted practice in industry. Fluid-driven equipment such as hydraulic machinery is one of the types of machines used, particularly in the field of high force generation or where a simple and inexpensive machine which can generate a very high force potential at relatively high frequencies is desired. A machine of this general type is shown in my patent application Ser. No. 444,842, filed in the United States Patent Office on July 21, 1954, entitled "Fluid-Operated Vibration Test Exciter," now Patent 2,773,482. That patent is referred to as showing and describing a machine of the general type to which the present application refers.

When thinking in terms of vibration test work, the force applied to the specimen is of an alternating nature. As a result of this alternating force, the acceleration, velocity and displacement of the specimen are all alternating quantities. When a specimen is being vibrated by a vibration exciter, different characteristics of its movement in space can be defined by various parameters. Thus, the frequency of the vibrations defines the time rate (C. P. S.) at which a specimen is being vibrated. The amplitude of vibration refers to the distance through which the specimen is being moved as it oscillates back and forth with respect to time. This may be expressed in inches peak to peak. It might also be stated that quite often amplitude is referred to as the double amplitude, this being the total excursion that the specimen makes. In other words, the specimen moves first in one direction a given amount, back through the neutral position, and in the opposite direction the same amount. The double amplitude defines the total excursion from maximum in one direction to maximum in the other.

Another parameter—velocity—refers to the rate of movement with respect to time. This velocity parameter is proportional to the product of the frequency of operation and the amplitude of motion. It may be expressed in inches per second. Another parameter is the acceleration of the specimen which refers to the rate of change of velocity. This may be expressed in inches per second per second. It is also interesting to note that the acceleration of the specimen is proportional to the applied force divided by the mass, i. e. the mass of the specimen to which force is applied.

As a result of experimental work of the last few years on air frame structures, it has been shown that such structures are subject to forces covering a wide range of frequencies. It has also been noted that the amplitude of these forces changes at different frequencies. The testing indicates that components or parts when mounted in their installations therefore experience different accelerations and different amplitudes of motion at different frequencies. As a result, it has been common, when specifying the abilities of a vibration test exciter, to require that the exciter be able to test components over a range of conditions before they are assembled in the complete unit. The specifications or "vibration envelope" sometimes require that forces at frequencies up to 75 cycles per second be such as to generate constant amplitude. Above this low frequency range, the envelope of conditions often requires that constant velocity must be maintained over a higher frequency range, and that constant acceleration must be maintained over a still higher frequency range. Furthermore, for different components, different envelopes of conditions are desirable.

When a vibration exciter is used under manual operating conditions, it is possible to obtain both a variation in frequency and a variation in generated force. The ability to vary the generated force allows the operator to control either the acceleration, amplitude or velocity of the specimen by monitoring both frequency and one of the three parameters mentioned, by manipulating two controls. In this way one can vary the frequency while holding any one of the three parameters constant.

However, holding any of the three parameters constant over a wide frequency range by manual means requires continual manipulation of the frequency control and the force control. It is desirable that the vibration exciter system be able to conduct the tests automatically without manual control. This requires that some means be provided for varying the frequency, and other means provided for automatically maintaining a control of the generated force. A typical test on a specimen under these conditions would consist in maintaining constant amplitudes automatically while varying the frequency over a given range. At an intermediate frequency range it would be desirable to switch over to maintaining constant velocity while still increasing the frequency, and then switching to an arrangement to hold constant acceleration over a still higher frequency range. It is an object of this invention to produce a vibration exciter system capable of maintaining any of these three parameters constant, as just outlined. Another object of the present invention is to provide an exciter system which can adjust the frequencies or sweep the frequency ranges automatically on constant displacement, constant velocity or constant acceleration lines, as desired, merely by a single adjustment for each one of the types or lines of cycling desired.

In Fig. 1 of the drawings there is shown schematically a hydraulic exciter system according to this invention adapted to give a constant double amplitude of vibration over a range of frequency by first adjusting the hydraulic motor and exciter valve means before running the test, and then controlling from the hydraulic pump.

In order to make these tests as nearly automatic as possible, a hydraulic motor has been added to the vibration exciter shown in my Patent Number 2,773,482, above referred to. This hydraulic motor is used to rotate the valve means of the exciter and thereby determine the frequency of the piston motion. The motor is driven by the hydraulic pump which drives the piston of the exciter.

Figure 1:
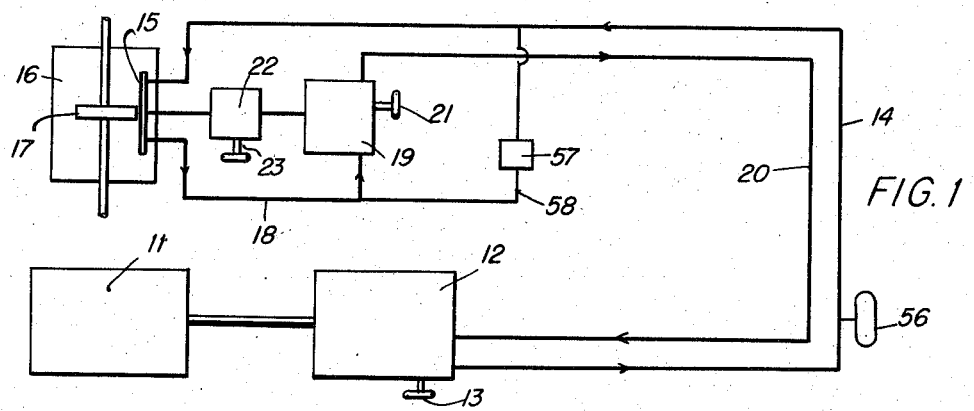

I will first explain a system adapted to maintain a constant amplitude of movement while automatically sweeping a range of frequencies. This is shown in Fig. 1. There is an A. C. constant speed motor 11 driving a constant speed, adjustable volume, pressure regulated pump 12. Fluids other than oil can be used. The pump has on it an adjustment control 13 for the pump flow or volume. The pipe carrying the fluid forward to the exciter proper goes to the rotating valve means 15 shown at the top of the figure. This valve means is located at the cylinder 16 containing the piston 17. The fluid return line from the cylinder is identified by the reference character 18. The exciter proper is shown and described in more detail in my Patent 2,773,482, above referred to (see, for example, Figs. 14 and 15).

The return line 18 goes to a hydraulic motor 19 and from the hydraulic motor there is a main return line 20 going back to the pump 12. The hydraulic motor 19 is a variable displacement motor with a control 21 by which its volume per revolution can be varied. This hydraulic motor drives a variable speed transmission 22 which has a speed or transmission ratio control 23 thereon. This variable speed transmission in turn rotates the valve means 15 in the piston cylinder 16, so in effect the hydraulic motor drives the valve means. A bleeder valve 57 is connected from the high pressure line 14 to the hydraulic motor inlet by line 58. This bleeder valve furnishes a very small quantity of oil to the motor to initiate rotation if the valve 15 should be stopped in the closed position. A surge suppressor 56 which is a form of an accumulator is connected in the high pressure line to reduce pressure surges when the pump is operating on constant delivery and the valve 15 is alternately opening and closing.

Changes or automatic cycling of the frequencies are obtained by varying the flow of the pump 12 in the following manner.

The desired amplitude of piston motion is first set by use of the volume control 21 on the hydraulic motor 19 or by the transmission ratio control 23 on the variable speed transmission 22. Since the same volume of oil per unit time passes through the valve means 15 of the exciter and the hydraulic motor 19, there is a fixed relationship between the velocity of the piston motion and the rotational velocity or speed of the motor which, in turn, controls the frequency of the piston motion. Therefore there is a fixed relation between the velocity of the piston and the frequency of the piston motion. For example, if the frequency is doubled by increasing the volume delivered by the pump, then the velocity of the piston motion is also doubled. This can occur because the piston amplitude remains constant. Thus, the frequency of the piston can be varied by the pump volume control 13 without varying the amplitude.

Figure 2:
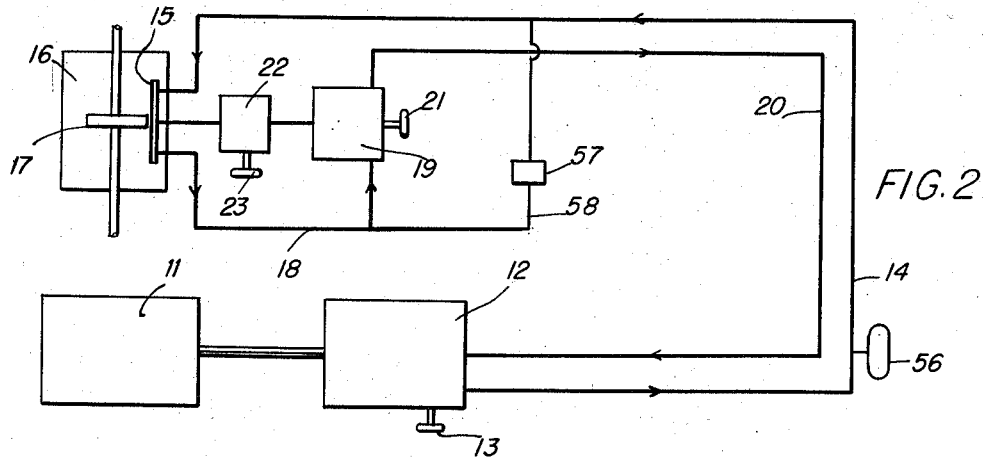
Fig. 2 is a similar schematic view of a system adapted to maintain constant velocity by first adjusting the pump pressure before starting the test, and then controlling or sweeping the frequency range, by adjusting the exciter valve means and hydraulic motor.
Figure 3:
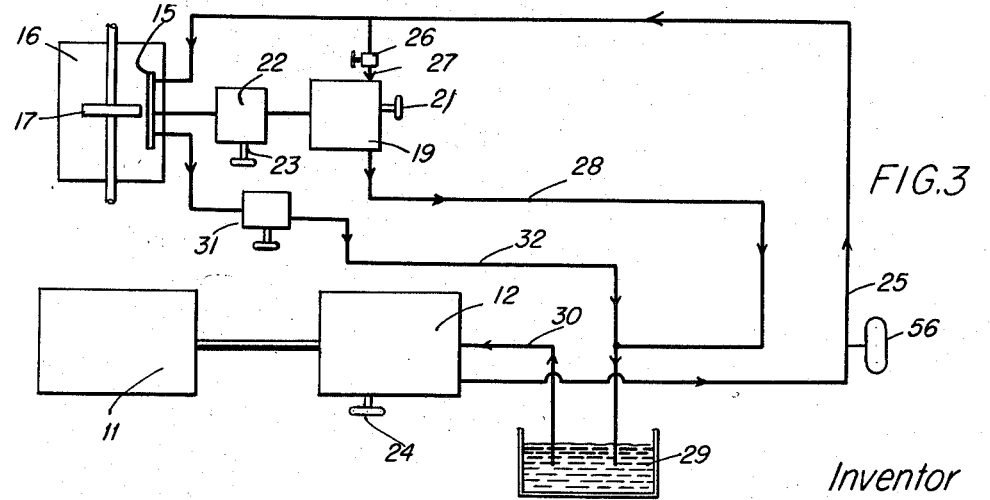
Fig. 3 is a similar schematic showing of a hydraulic exciter system adapted to maintain constant acceleration by first adjusting the pump pressure before the test, and thereafter controlling frequency by adjusting the flow to the hydraulic motor.
Figure 4:
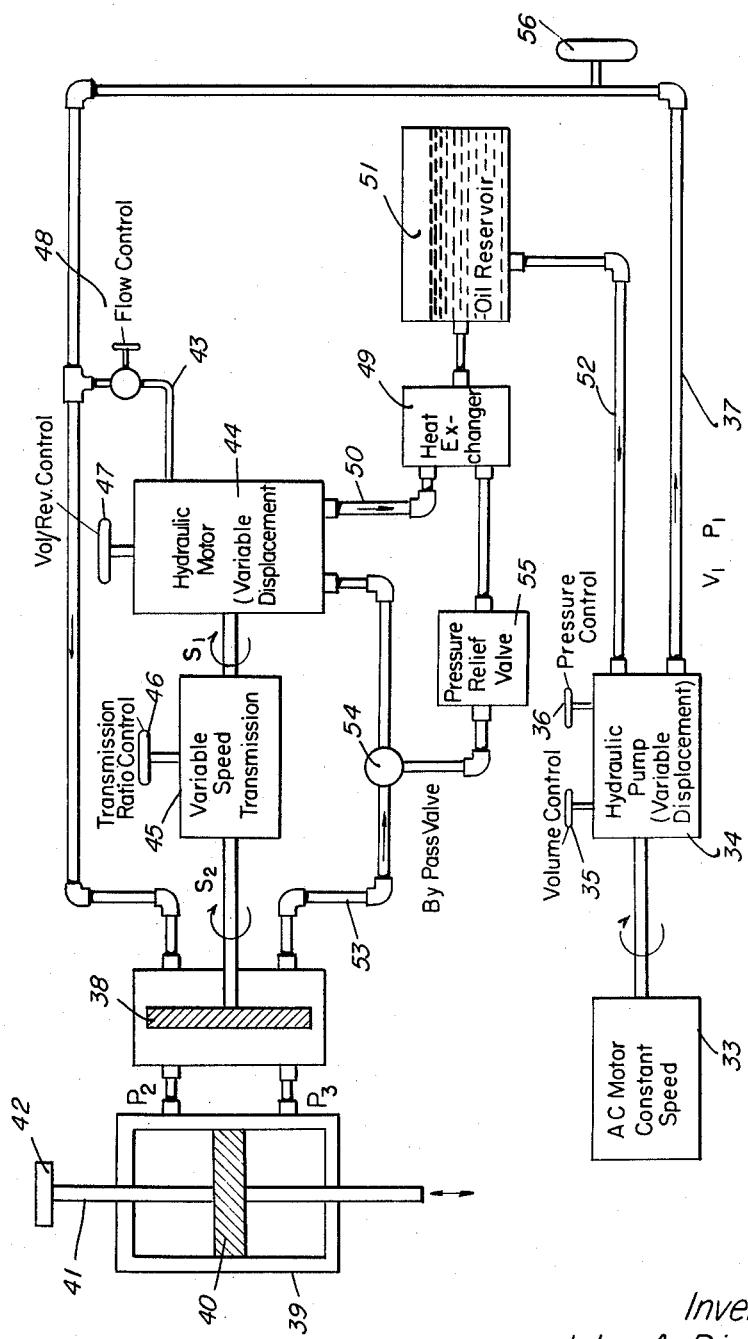
Fig. 4 is a schematic showing of a composite exciter system which is able to be adjusted to keep any one of the desired parameters at a constant figure in accordance with the invention.

The above relationship and those of Figs. 2 and 3 can be expressed mathematically. In order that the explanation may be clear, in this mathematical expression the reference letters of the composite apparatus of Fig. 4 are used. The relationship of Fig. 1 can be expressed as follows:

Let $V_1$ = volume of oil/unit time delivered by pump
$P_1$ = pressure of oil
$S_1$ = rotational speed of hydraulic motor
$S_2$ = rotational speed of valve means
$X$ = peak to peak amplitude of piston
$f$ = frequency of piston motion in C. P. S.
$A$ = area of the piston Then (1) $V_1 = XfA$
(2) $f = K_V S_2$ where $K_V$ = valve constant
(3) $S_2 = RS_1$ where $R$ = speed ratio of transmission
(4) $S_1 = K_m V_1$ where $$K_m = \frac{1}{\text{vol./rev.}}$$

of the motor and can be adjusted by volume/revolution control 47

Combining (5) $V_1 = 2XK_V R K_m V_1$ or (6) $$X = \frac{1}{2K_V R K_m}$$

(7) $f = K_V R K_m V_1$

Thus, it can be seen from Equation 6 that the displacement X is independent of the volume $V_1$, and from Equation 7 that the frequency $f$ is directly proportional to $V_1$. Therefore the frequency can be varied by varying $V_1$ without varying the displacement. In order to set the displacement to the desired value, either $K_m$ or $R$ can be varied.

In Fig. 2 is shown a system adapted to maintain the velocity parameter constant. There is the same constant speed A. C. motor 11 driving the variable displacement pump 12 having the same volume adjustment control 13 thereon. The latter controls the flow or volume in both Fig. 1 and Fig. 2, but while in Fig. 1 it is used to vary the frequency during the testing, in Fig. 2 it is adjusted prior to the testing to set the velocity of the piston.

In this case the system is left connected as outlined for constant displacement above, but the method of varying frequency is changed. It can readily be shown that the velocity of piston motion is proportional to the product of the displacement and frequency. Thus $$\text{velocity} = v = KfX$$

substituting for $f$ and $X$ from Equations 6 and 7 gives $$v = \frac{KV_1}{2}$$

and from Equation 7

$$f = K_v R K_m V_1$$

This shows that the velocity is only a function of the volume which can be set and left fixed and the frequency adjusted by varying either R or $K_m$ by the controls 46, 47, respectively.

There is the same supply line 14 to the rotating valve means 15, the same cylinder 16 and the piston 17 therein. There is the same return line 18 from the rotating valve means 15 to the hydraulic motor 19 and the same main return line 20 from the hydraulic motor and variable displacement pump. In operating the apparatus of Fig. 2, the constant velocity of the driving head at different frequencies can be achieved by setting the control 13 on the variable displacement pump 12 at a constant discharge of gallons per minute and controlling the transmission ratio control 23 to give the cycling of the frequencies. If, by any chance, more range in frequency is required than is available by changing the variable speed drive, further frequency range can be obtained by adjusting the hydraulic motor 19 by means of the volume control 21 which will adjust the volume per revolution that passes through the hydraulic motor.

To obtain a constant acceleration parameter of a hydraulic exciter system such as shown in Fig. 1 or 2, the parts can be connected as shown in Fig. 3. In this case there is the A. C. motor 11, variable displacement pump 12 with a pressure control 24 thereon, the variable speed transmission 22, hydraulic motor 19 taking care of the usual valve means 15, cylinder 16 and piston 17. There is a supply line 25 from the variable displacement pump 12 to the valve means 15. In addition there is a flow control 26 in a short line 27 connecting the supply line 25 to the hydraulic motor 19 directly and controlling the flow of fluid to the hydraulic motor. On the other side of the hydraulic motor is a return line 28 going to a tank 29 which supplies the variable displacement pump by an intake 30. The pressure control 24 on the variable displacement pump can be called a gravity adjusting means. In connection with this setting of the pump there is a pressure relief valve 31 connected in the return line 32 from the valve means 15 to the tank 29. This pressure relief valve 31 has the function of maintaining a constant back pressure on the valve means 15. By thus adjusting the pump on both sides, constant acceleration at different frequencies can be obtained. Once these two pressure adjustments have been set, the range frequency can be swept in the following manner. The hydraulic motor 19 is set for minimum volume of flow by means of the flow control 26 between the supply line and the hydraulic motor. Full pressure is available at the variable displacement pump to drive the motor with hydraulic fluid direct from the variable displacement pump 12 at controlled pressure. On the other hand, since it is desired to obtain constant acceleration, the piston 17 uses less volume of oil as the speed increases. The decrease in oil required by the piston at least compensates for the increased demand of the motor 19. Therefore feeding of the hydraulic motor 19 directly does not have any objectionable effect on the maximum volume requirement of the pump. Under these conditions the frequency is controlled by adjusting the amount of fluid led through the hydraulic motor 19, which can be done for the ordinary range by the flow control 26. If more range is required than in the case of Fig. 2, the volume per revolution control 21 can be provided on the hydraulic motor, as in the case of Fig. 2.

In applications where the specimen on the exciter is essentially a pure mass load, the force required to drive the piston is proportional to the product of the moving mass and the desired acceleration. In the cylinder the force exerted on the piston is proportional to the pressure drop across the piston. Therefore the acceleration level is determined by the pressure difference across the piston. When constant acceleration is required, a direction control valve 54 is rotated to block oil flow to the hydraulic motor and divert it through the pressure relief valve 55 (see Fig. 4). Thus, the pressure drop across, and thereby the acceleration of, the piston is determined by the settings of the pump pressure control 36 and pressure relief valve 55.

The frequency of operation is again determined by the speed of the hydraulic motor and the transmission ratio. In this case the flow control valve 48 is opened to allow oil direct from the pump to flow through the motor. Since high pressure oil is now available, the motor 44 is set for minimum volume per revolution by motor volume control 47, and the frequency varied by transmission ratio control 46 or flow control valve 48.

In this application the pump must furnish a volume of oil sufficient to drive both the exciter and the motor. However, the volume requirements of the exciter decrease with frequency, while that of the motor increases with frequency, resulting in essentially a constant demand.

It will be seen that Figs. 1, 2 and 3, respectively, provide means by which the parameters of amplitude, velocity and acceleration can be maintained constant while the frequency is being varied. They make it possible to provide automatic cycling of the frequencies. In addition to controlling force while sweeping a frequency range, the hydraulic system can also be used to provide stability for maintaining a constant load while a specimen is being given a fatigue test. It also makes possible the use of a recording system to provide a graphic record of load, frequency, deflection, total cycles, etc., including automatic shut-off of the system to take effect at any desired predetermined percentage of change in the load.

I will now describe the preferred form of my automatic cycling hydraulic exciter system. It is shown in Fig. 4 of the drawings and consists of a combination of the three systems of Figs. 1, 2 and 3 made over into a composite system capable of maintaining constant in succession any of the three parameters desired, namely, amplitude, velocity or acceleration.

In the composite system of Fig. 4, the parts are very similar to those in Figs. 1–3. There is an A. C. constant speed motor 33 which drives the variable displacement hydraulic pump 34 in the direction of the curved arrow on the shaft between them. On the pump are a volume control 35 and a pressure control 36. There is a supply line 37 from the pump to the valve means 38 of the exciter, the exciter having a cylinder 39 and a piston 40 with a piston rod 41 and a table 42 to carry the specimen. There is a side connection 43 from the supply line 37 to a variable displacement hydraulic motor 44. The hydraulic motor drives the valve means 38 of the exciter thru a variable speed transmission 45. On the variable speed transmission is a transmission ratio control 46 and on the hydraulic motor is a volume per revolution control 47. In addition, on the side line 43 connecting the supply line 37 to the hydraulic motor 44 is a flow control 48. From the hydraulic motor 44 to a heat exchanger 49 is a short connecting line 50, and the heat exchanger is connected to an oil reservoir 51 which in turn is connected by a return line 52 to the hydraulic pump 34. There is a return line 53 from the valve means 38 of the exciter to the hydraulic motor. In this return line 53 is a direction control valve 54 adapted, when turned, to divert the liquid coming into the return line 53 from the valve means 38 to a pressure relief valve 55. The pressure relief valve 55 in turn is connected to the heat exchanger 49.

If the system of Fig. 4 is to be used to give constant displacement of the pump, the flow control valve 48 is closed and the direction control valve 54 in the discharge line is open to allow oil flow from the exciter to the hydraulic motor 44 only. Therefore no oil flows to or from the pressure relief valve 55 when constant displacement is desired. On the hydraulic pump the pressure control 36 is set at maximum and the volume control 35 is varied to give the variations in frequencies desired. The high pressure oil leaving the hydraulic pump 34 passes through the valve means 38 driving the exciter piston 40 and eventually is discharged through the discharge line 53 to flow through the hydraulic motor 44, heat exchanger 49, and finally, the oil reservoir 51. As in the case of the construction of Fig. 1, there results a fixed relationship between the velocity of the piston motion and the rotational velocity or speed of the motor which in turn controls the frequency of the piston motion. With this fixed relation between the velocity of the piston and the frequency of the piston motion, the piston amplitude remains constant. The frequency of the piston motion can be varied by regulating the rate of flow through the pump 34 by control 35, without varying the amplitude.

If constant velocity of the piston is desired rather than constant displacement or amplitude, one proceeds in analogy to the operation of the system of Fig. 2. Velocity is only a function of the volume and this can be set and left fixed. The frequency can be adjusted by varying either the transmission ratio control 46 on the variable speed transmission 45 or the volume per revolution control 47 on the hydraulic motor 44. It will be seen that by first adjusting the system at the volume control 35 and the pressure control 36 on the hydraulic pump 34, one can obtain variations in frequency merely by varying the adjustment of the transmission ratio control 46 or the volume control 47 on the hydraulic motor 44.

If the parameter desired to be kept constant is the acceleration of piston motion, as previously explained the acceleration level is determined by the difference in pressure across the piston. This is measured by the peak pressure difference at the two points $P_2$, $P_3$ marked in Fig. 4, where the fluid passes into and out of the cylinder 39. Means are provided to fix the difference in pressure drop across the piston. Therefore when constant acceleration is required the direction control valve 54 is rotated to block oil flow to the hydraulic motor and the oil is diverted through the pressure relief valve 55 to the heat exchanger 49 and oil reservoir 51. With this setting the pressure drop across $P_2$, $P_3$ is determined by the settings of the pressure control 36 on the hydraulic pump 34 and the pressure relief valve 55. Having set these two elements, the frequency of operation is again determined by the speed of the hydraulic motor and the transmission ratio of the variable speed transmission. The flow control valve 48 in the side connection 43 between the supply line 37 to the hydraulic motor 44 is opened to allow oil direct from the pump to flow through the motor. This oil is at high pressure and therefore the motor can be set for minimum volume per revolution by the volume/revolution control 47 on the hydraulic motor 44. The frequency is varied by using the transmission ratio control 46 on the variable speed transmission 45 and flow control valve 48 in the side connection 43 supplying the hydraulic motor. As in the case of Fig. 3, the pump has to furnish a volume of oil sufficient to drive both the exciter and the motor. However, the volume requirement of the exciter decreases with increase of frequency, while that of the motor increases with an increase in frequency, resulting in essentially a constant demand for oil.

It will be seen that this invention provides a means to sweep a frequency range while holding any one of the parameters of acceleration, velocity or displacement constant. The invention further provides arrangements for very simple changes of operating conditions to allow shifting from one of these parameters to either of the others. These changes are simple enough to respond readily to the incorporation of automatic control, including, of course, automatic transfer from one parameter to another.

What is claimed is:

1. A hydraulic exciter system adapted to be used over a wide frequency range, comprising a reciprocatory piston, a cylinder containing the piston, valve means for the piston, a hydraulic motor to drive the valve means, a hydraulic pump connected to fluidly drive both the motor and the piston connections by which the valve means may direct fluid from the pump to the cylinder, in combination with means to vary the flow of the pump, means to vary the speed of the valve means without varying the flow of the pump, and means to fix the difference in pressure drop across the piston, whereby the amplitude or the velocity or the acceleration of the reciprocatory piston can be kept constant while the frequency is varied.

2. A hydraulic exciter system adapted to be used over a wide frequency range, comprising a reciprocatory piston, a cylinder containing the piston, valve means for controlling fluid flow to the piston for controlling operation of the piston, a hydraulic motor to drive the valve means, a hydraulic pump connected to fluidly drive both the motor and the piston, connections by which the valve means may direct the fluid from the pump to the cylinder, means providing a series fluid connection between said motor, said cylinder and said pump, in combination with means to vary the flow of the pump and means to vary the speed of the valve means without varying the flow of the pump; whereby the amplitude or the velocity of the reciprocatory piston of the exciter system can be kept constant while the frequency is varied.

3. A hydraulic exciter system adapted to be used over a wide frequency range, comprising a reciprocatory piston, a cylinder containing the piston, valve means for controlling fluid flow to the piston for controlling the operation of the piston, a hydraulic motor to drive the valve means, in combination with a hydraulic pump connected to fluidly drive both the motor and the piston, means providing a series fluid connection between said motor, said cylinder and said pump and connections by which the valve means may direct the fluid from the pump to the cylinder, and means on the pump to adjust the pump flow and thereby vary the frequency of the reciprocatory piston of the exciter system without varying the amplitude of motion of the piston.

4. A hydraulic exciter adapted to be operated over a wide frequency range, comprising a constant speed adjustable volume fluid pump, a piston and a cylinder for the piston, and valve means connected to pass fluid from the pump to cause reciprocation of the piston, in combination with a hydraulic motor fluidly driven by the pump, means providing a series fluid connection between said motor, said cylinder and said pump, and connections by which the valve means may direct the fluid from the pump to the cylinder, a variable speed drive driven by the hydraulic motor connected to drive the valve means, and means on the pump to adjust the flow and thereby vary the frequency of reciprocation of the piston without varying the amplitude of motion of the piston.

5. A hydraulic exciter system having a piston adapted to be reciprocated over a wide frequency range, comprising, a cylinder for the piston and an adjustable volume fluid pump therefor, and valve means connected to feed fluid from the pump to cause reciprocation of the piston, in combination with a hydraulic motor also fluidly driven by the pump, means providing a series fluid connection between said motor, said cylinder and said pump, and connections by which the valve means may direct the fluid from the pump to the cylinder, a variable speed drive driven by the hydraulic motor connected to drive the valve means, and means on the speed drive to vary the valve means speed without varying the rate of fluid flow; whereby the velocity of the piston is kept constant when the valve speed and therefore the frequency is varied.

6. A hydraulic exciter system having a piston adapted to be reciprocated over a wide frequency range, comprising a variable displacement fluid pump, pressure control means thereon, a cylinder for the piston and valve means connected to the cylinder to feed fluid from the pump to cause reciprocation of the piston, in combination with a hydraulic motor also fluidly driven by the pump to drive the valve means, means connected between the valve means and the hydraulic motor to vary the speed of the valve means without varying the rate of fluid flow, a return line for the fluid from the cylinder and pressure relief means in that line; whereby the acceleration of the piston is kept constant when the valve speed, and therefore the frequency, is varied.

7. A hydraulic exciter according to claim 6 in which the pressure relief means comprise a pressure relief valve and an open tank to which the return line leads.

8. A hydraulic exciter system according to claim 6 in which there is a return line from the valve means to the hydraulic motor and a direction control valve in that line as part of the pressure relief means, whereby the discharge fluid of the piston can be directed to a pressure relief valve or to the hydraulic motor according to whether or not it is desired to keep the acceleration constant, on the one hand, or either the velocity or amplitude constant, on the other hand.

9. In a method of operating over a range of frequencies a hydraulic exciter system having an exciter with a piston therein and a valve means for the exciter, in which a variable displacement hydraulic pump is used both to operate the valve means of the exciter system through a hydraulic motor and to operate the piston of the exciter system, the steps of establishing fluid connections between the motor and exciter in series with the pump, holding the amplitude of the piston movement constant and varying the frequency by varying equally the volume of fluid delivered to the piston and the valve means by the pump.

10. In a method of operating over a range of frequencies a hydraulic exciter system having an exciter with a piston therein and a valve means for the exciter, in which a variable displacement hydraulic pump is used both to operate the valve means of the exciter system through a hydraulic motor and to reciprocate the piston of the exciter system, the steps of establishing fluid connections between the motor and exciter in series with the pump, holding the velocity of the piston movement constant and varying the frequency by holding the volume of liquid delivered to the valve means and the piston constant while varying the speed of the valve means.

11. In a method of operating over a range of frequencies a hydraulic exciter system having an exciter with a piston therein and a valve means for the exciter, in which a variable displacement pump is used both to fluidly reciprocate the piston of the exciter system and to drive through a hydraulic motor the valve means of the exciter system, the steps of holding constant the pressure differential across the piston and varying the speed of the valve means; whereby the acceleration of the piston of the exciter system is held constant while the frequency is varied.

12. A hydraulic exciter system as claimed in claim 6 having means on said hydraulic motor to vary the volume per revolution of the motor, whereby to increase the frequency range.

13. A hydraulic exciter system adapted to be used over a wide frequency range, comprising a reciprocatory piston, a cylinder containing the piston, valve means for controlling fluid flow to the piston for controlling operation of the piston, a hydraulic motor to drive the valve means, means on said motor to vary the volume per revolution of the motor, a hydraulic pump connected to fluidly drive both the motor and the piston, means on said pump to control the pump flow volume, connections by which the valve means may direct the fluid from the pump to the cylinder, means providing a series fluid connection between said motor, said cylinder and said pump, in combination with variable speed transmission means between said valve means and said hydraulic motor, said transmission means having a ratio control thereon, whereby either the amplitude or the velocity of the reciprocatory piston of the exciter system can be kept constant while the frequency is varied, by regulation, in the former case, of the pump volume control or, in the latter case, by regulation of said ratio control or said motor volume control.

References Cited in the file of this patent

UNITED STATES PATENTS

| | | |
|---|---|---|
| 9,408 | Harrison | Oct. 12, 1880 |
| 1,197,238 | Shue | Sept. 5, 1916 |
| 1,753,562 | Ferris | Apr. 8, 1930 |
| 2,228,700 | Hamner et al. | Jan. 14, 1941 |
| 2,402,300 | Shimer | June 18, 1946 |

OTHER REFERENCES

Ser. No. 366,840, Obtresal (A. P. C.), published Apr. 27, 1943.